United States Patent
Ha

(10) Patent No.: US 7,102,534 B2
(45) Date of Patent: Sep. 5, 2006

(54) APPARATUS FOR MEASURING PISTON TEMPERATURE

(75) Inventor: Kyoung-Pyo Ha, Suwon (KR)

(73) Assignee: Hyundai Motor Company, Seoul (KR)

( * ) Notice: Subject to any disclaimer, the term of this patent is extended or adjusted under 35 U.S.C. 154(b) by 462 days.

(21) Appl. No.: 10/465,900

(22) Filed: Jun. 18, 2003

(65) Prior Publication Data

US 2004/0105484 A1    Jun. 3, 2004

(30) Foreign Application Priority Data

Dec. 3, 2002   (KR) ............... 10-2002-0076297

(51) Int. Cl.
| | |
|---|---|
| G08C 19/12 | (2006.01) |
| G08C 19/16 | (2006.01) |
| G01M 15/00 | (2006.01) |
| G01K 13/00 | (2006.01) |
| G01K 1/08 | (2006.01) |
| G01K 1/14 | (2006.01) |

(52) U.S. Cl. .................. 340/870.17; 340/870.01; 340/870.18; 374/144; 73/117.3; 73/116; 73/119 R

(58) Field of Classification Search ........... 340/870.17, 340/513, 870.01, 870.18; 374/134, 29, 30, 374/31, 141 T, 29 T, 117.1 T
See application file for complete search history.

(56) References Cited

U.S. PATENT DOCUMENTS

| | | | | |
|---|---|---|---|---|
| 4,590,472 A | * | 5/1986 | Benson et al. ......... | 340/870.04 |
| 5,106,202 A | * | 4/1992 | Anderson et al. ........... | 374/144 |
| 5,161,892 A | * | 11/1992 | Shigezawa et al. ......... | 374/179 |
| 5,270,538 A | * | 12/1993 | Vali et al. .............. | 250/227.18 |
| 5,710,375 A | * | 1/1998 | Roger ....................... | 73/117.3 |
| 6,062,087 A | * | 5/2000 | Vovan ........................ | 73/726 |

* cited by examiner

*Primary Examiner*—Jeffery Hofsass
*Assistant Examiner*—Sisay Yacob
(74) *Attorney, Agent, or Firm*—Morgan Lewis & Bockius LLP

(57) ABSTRACT

An apparatus measures temperature of a reciprocating piston and comprises one or more thermocouples of which one end is inserted to a predetermined point of the piston and generates a potential difference according to temperature of the predetermined point. A telemetry unit is mounted on a big end of a connecting rod, computes the piston temperature on the basis of the potential difference, and wirelessly transmits the piston temperature signal.

18 Claims, 3 Drawing Sheets

APPARATUS FOR MEASURING PISTON TEMPERATURE

FIELD OF THE INVENTION

Generally, the invention relates to an apparatus for measuring the temperature of a piston. More particularly, the apparatus measures piston temperature with a telemetry unit.

BACKGROUND OF THE INVENTION

Typically, in an internal combustion engine, driving power is originated from the explosion of fuel. During the explosion, heat is generated and emitted and the power generated from the explosion is transferred to a piston. Therefore, the piston is exposed to high temperatures from the combustion of the fuel. Accordingly, measuring piston temperature is necessary for improving engine stability and performance.

A variety of methods for measuring piston temperature have been studied. One such unit is a telemetry unit. The telemetry unit has several advantages over other methods of measuring piston temperature. Some of these advantages include transmitting a piston temperature signal to the outside of the engine without wires and measuring piston temperature regardless of piston movement. In the typical methods employed the telemetry unit is mounted on the piston. A drawback of this configuration is that the piston must have a space for receiving the telemetry unit. Therefore, the piston must be specifically redesigned for measuring piston temperature.

A redesigned piston has a load distribution that differs from that of the original piston. Therefore, another drawback is that the friction between the piston and the cylinder wall changes. Accordingly, the redesigned piston has a piston temperature that differs from the original mass produced piston. Therefore, temperature readings from the redesigned piston do not accurately reflect the circumstances within the mass-produced engine.

SUMMARY OF THE INVENTION

An apparatus for measuring temperature of a reciprocating piston according to the present invention comprises one or more thermocouples of which one end is inserted into a predetermined point of the piston. The thermocouples generate a potential difference according to temperature of the predetermined point. A telemetry unit, which is mounted on a big end of a connecting rod, computes the piston temperature on the basis of the potential difference and wirelessly transmits the piston temperature signal.

Preferably, the telemetry unit is mounted on a connecting rod cap that is attached to the big end of the connecting rod. The thermocouple passes through a piston pin so that one end of the thermocouple is inserted into the predetermined point of the piston. It is also preferable that a bracket is mounted on an end of the piston pin. The interior of the piston pin is filled with a buffer material so that the thermocouple passes through the bracket and the buffer material with protection.

In another preferred embodiment a piston pin section of the thermocouple passing through the piston pin is formed with multi-wire.

Preferably, the apparatus for measuring piston temperature according to this invention further comprises a cold junction temperature detector so the telemetry unit can compute the piston temperature by adding the cold junction temperature and a relative temperature between a hot junction and the cold junction of the thermocouple. The cold junction of the thermocouple is preferably located inside the telemetry unit. Preferably, an isothermal block is provided with the telemetry unit so that the cold junction is located within the isothermal block of the telemetry unit.

In alternative embodiments the telemetry unit also comprises one or more multiplexers processing signals from the one or more thermocouples. An A/D converter converting analog signals from the multiplexer to digital signals. A cold junction temperature detector for measuring the cold junction temperature. A processor computing the piston temperature on the basis of digital signals from the A/D converter and signals from the cold junction temperature detector. Also included is a wireless transmitting interface for transmitting the piston temperature signal from the processor in a wireless communication manner.

A wireless receiving interface, which receives the transmitted piston temperature signal from the wireless transmitting interface is preferably mounted on a fixed part of the engine, particularly on an oil pan.

A frequency range used in the wireless communication between the wireless transmitting interface and the wireless receiving interface is set to minimize interference with a frequency range used in an ECU. Particularly, the frequency range used in the wireless communication is preferably in the range of about 430 MHz–440 MHz.

BRIEF DESCRIPTION OF THE DRAWINGS

The accompanying drawings, which are incorporated in and constitute a part of the specification, illustrate an embodiment of the invention and read together with the description, serve to explain the principles of the invention. In the drawings.

DETAILED DESCRIPTION OF THE INVENTION

Figure 1:
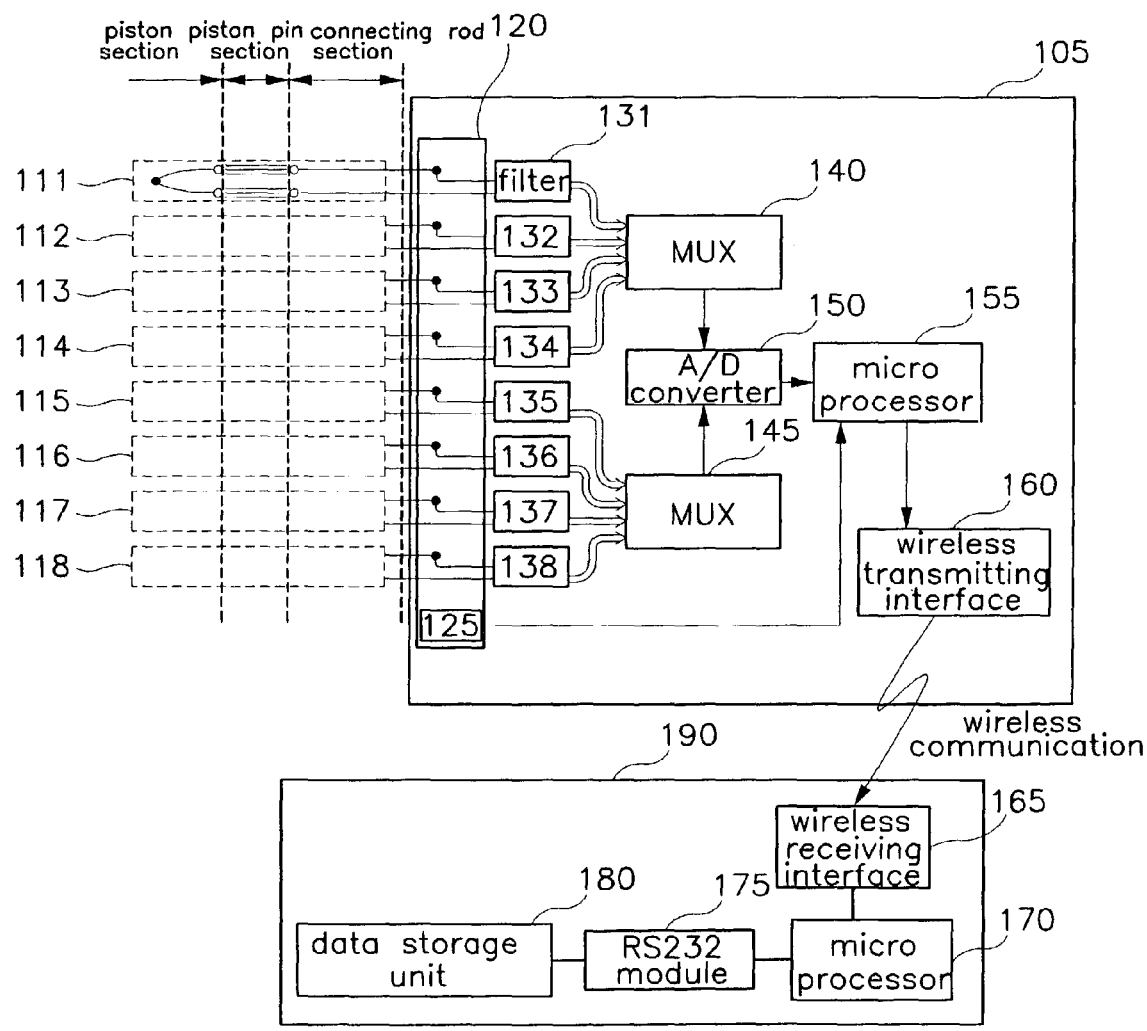
FIG. 1 is a block diagram showing an apparatus for measuring piston temperature according to an embodiment of the present invention.

FIG. 1 shows a block diagram of an apparatus for measuring piston temperature according to an embodiment of the present invention. The apparatus for measuring piston temperature according to this invention is provided with one or more thermocouples 111–118, for example, eight thermocouples, so as to measure piston temperature at predetermined points. The thermocouples are connected to a telemetry unit 105 which computes the piston temperature on the basis of the differential potential received from the thermocouples. The thermocouples 111–118 are formed with typical materials used in a field of the art. For example, an embodiment according to this invention uses Chromel (an alloy of chrome and nickel) and Alumel (an alloy of aluminum and nickel).

The telemetry unit 105 is provided with an isothermal block 120 for cold junction compensation and a cold junction temperature detector 125. The cold junction temperature detector 125 measures temperature of the isothermal block 120, at the position where the thermocouples 111–118 are located. The cold junction temperature detector 125 is an arbitrary temperature detector and is preferably an RTD (Resistance Temperature Detector). The isothermal block 120 is an adiabatic area isolated from the exterior of the isothermal block 120 and has constant temperature within the isothermal block 120. Furthermore, the telemetry unit 105 is provided with noise filters 131–138, which are connected to the thermocouples 111–118, respectively, to prevent a thermal noise involved with signals from the thermocouples 111–118. The telemetry unit 105 is also provided with multiplexers 140 and 145 to process the signals from the noise filters. It is preferable that dual 4-channel multiplexers 140 and 145 are used so that each multiplexer 140 and 145 is connected to four noise filters for filtering the signals from the filters 131–138.

The telemetry unit 105 also comprises an A/D (Analog to Digital) converter 150 for converting an analog signal to a digital signal. A microprocessor 155 is also included for processing the piston temperature signal. A wireless transmitting interface 160 is included for transmitting a piston temperature signal from the microprocessor 155. Accordingly, the analog signals from the dual multiplexers 140 and 145 are converted to digital signals through the AD converter 150 and the digital signals from the AD converter 150 are transmitted to the microprocessor 155. The cold junction temperature is detected from the isothermal block 120 signals, generated by the cold junction temperature detector 125 and transmitted to the microprocessor 155 after being converted to digital signals by the AD converter 150.

The digital signals transmitted from the AD converter 150 to the microprocessor 155 represent a relative temperature between the cold junction and the hot junction of the thermocouples 111–118. Accordingly, the microprocessor 155 computes the piston temperature by adding the cold junction temperature from the cold junction temperature detector 125 and the relative temperature from the AD converter 150.

The filters 131–138, the multiplexers 140 and 145, the AD converter 150, the microprocessor 155, and the wireless transmitting interface 160 are obvious to a skilled person in the art, so a more detailed description is omitted.

According to an embodiment of the present invention the apparatus for measuring piston temperature is provided with a wireless receiver 190 that comprises a wireless receiving interface 165 and a microprocessor 170. The piston temperature signal from the wireless transmitting interface is received by the wireless receiving interface 165 and is delivered to the microprocessor 170. The wireless receiving interface 165 can be any unit that receives radio signals, preferably an antenna.

Wireless communication between the wireless transmitting interface 160 and the wireless receiving interface 165 can be performed at an arbitrary frequency in the range between about 400 MHz–450 MHz, more preferably between about 430 MHz–440 MHz, and more preferably about 430 MHz. The above-described frequency used in the wireless communication is obtained experimentally so as to minimize frequency interference with an ECU of the engine.

The piston temperature signal processed by the microprocessor 170 is transferred to a data storage unit 180, such as a PC (Personal Computer) or the like, through a network. In FIG. 1, an RS232 module 175 is provided with the wireless receiver 190 and acts as an interface between the microprocessor 170 and the data storage unit 180. While a PC can be employed as the data storage unit 180, a different type of data storage unit 180 can also be employed. Accordingly, the interface between the microprocessor 170 and the data storage unit 180 can be changed in accordance with the type of data storage unit 180.

The mechanical connection of the telemetry unit 105, the thermocouples 111–118, and the wireless receiver 190 is described hereinafter, with reference to FIG. 2 and FIG. 3.

Figure 2:
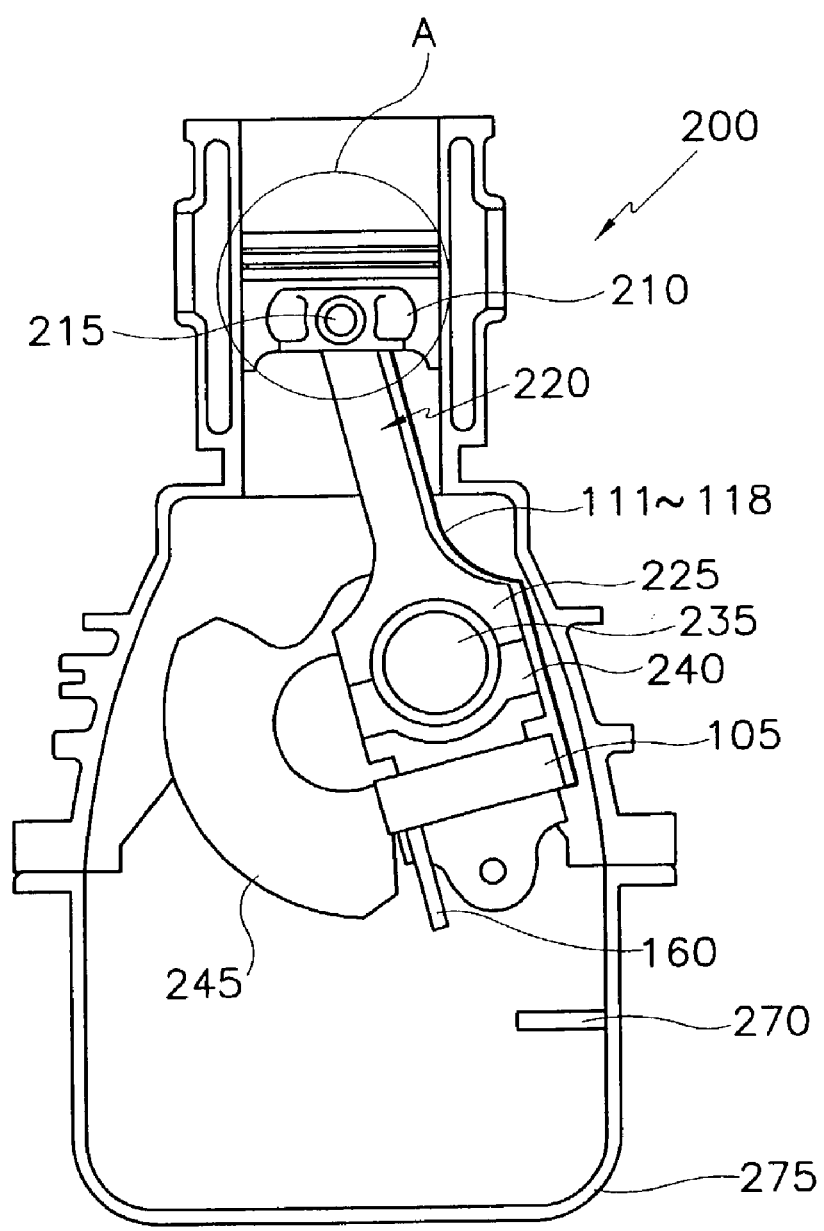
FIG. 2 is a schematic view showing an apparatus for measuring piston temperature according to an embodiment of the invention mounted on an engine.
Figure 3:
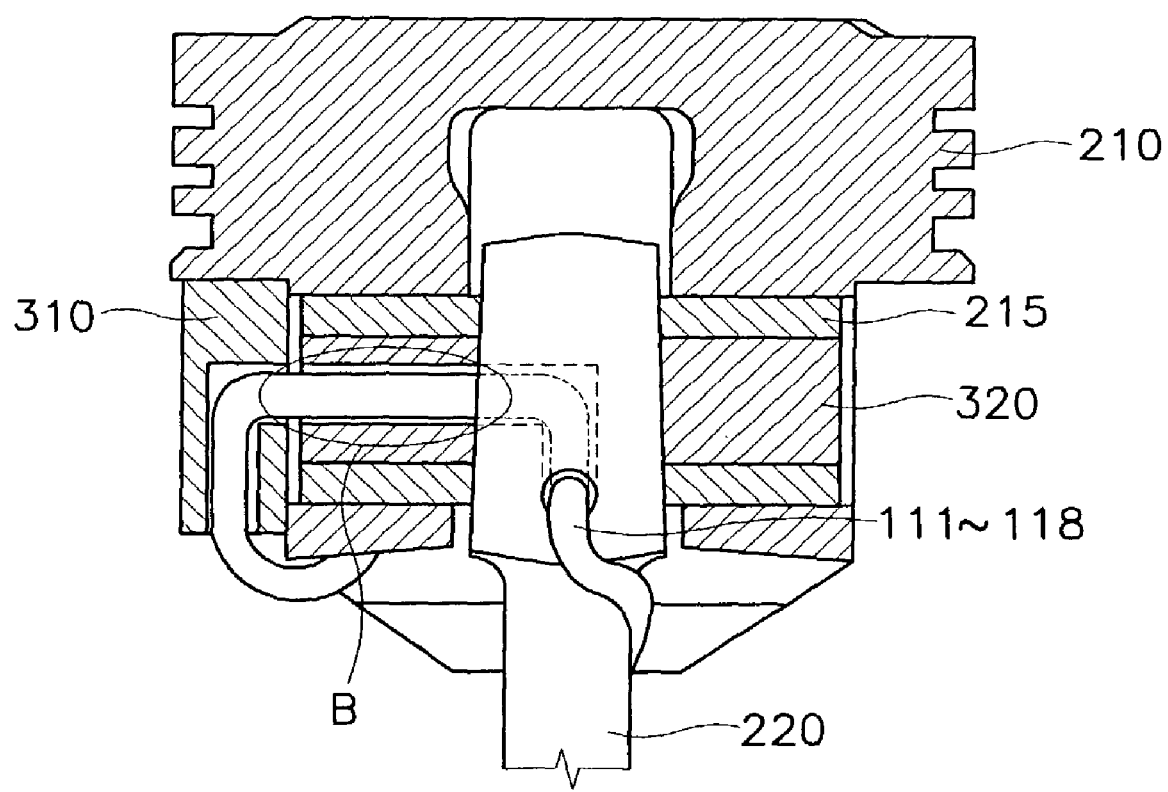
FIG. 3 is a detailed view of section A of FIG. 2.

FIG. 2 shows a piston 210 of an engine 200 connected to the crank shaft 235 by a connecting rod 220. For purposes of explanation, the end of the connecting rod 220 that is directed to the piston 210 is defined as a small end. The other end of the connecting rod 220 that is directed to the crank shaft 235 is defined as a big end 225. In an embodiment of the present invention, the telemetry unit 105 is mounted on the big end 225. Accordingly, the telemetry unit 105 is not mounted on the piston 210 so that the piston has no change in shape or load distribution during use. More preferably, the telemetry unit 105 is attached to a connecting rod cap 240 of the big end 225. The connecting rod cap 240 is obvious to a skilled person in the art.

The telemetry unit 105 is attached to the connecting rod cap 240 so that a change in movement of the piston 210, caused by the weight of the telemetry unit 105, does not occur. According to the present invention, revolutionary inertia and center of the connecting rod 220 and the crank shaft 235 may be changed by attachment of the telemetry unit 105, however, these can be easily compensated by changing a balancing weight 245 of the crank shaft 235.

If the thermocouples 111–118 between the telemetry unit 105 and the piston 210 are not fixed, the unfixed section can be easily fractured, therefore, it is preferable that the thermocouples 111–118 are fixed to the connecting rod 220. Furthermore, it is preferable that the thermocouples 111–118 pass through a piston pin 215 so that the hot junction of the thermocouples from the piston pin 215 is inserted to the predetermined point for measuring the piston temperature. The two ends of the thermocouples 111–118 are fixed to the connecting rod 220 and the piston 210 so that the section of the thermocouple passing through the piston pin is only mechanically loaded during reciprocation of the piston 210. In order to prevent the thermocouples 111–118 from fracture caused by the mechanical load, it is preferable that a bracket 310 is mounted on one end of the piston pin 215. FIG. 3 shows the bracket 310 guiding and providing protection for the thermocouples 111–118. Furthermore, the inside of the piston pin 215 is filled with buffer materials 320 so as to protect the thermocouples 111–118 from friction with the piston pin 215.

While the crank shaft is driven by the reciprocation of the piston 210, a torsional moment is applied to a piston pin section B of the thermocouples 111–118. In order to prevent the thermocouples 111–118 from a fracture caused by the torsional moment, the piston pin section B of the thermocouples 111–118 is formed with multi-wire.

As described above, the hot junction of the thermocouples 111–118 is inserted into the predetermined point of the piston 215 for measuring piston temperature. It is preferable that a hollow is formed at the predetermined point of the piston 215 so that the hot junction of the thermocouples 111–118 is tightly inserted therein.

Referring back to FIG. 2, the wireless receiving interface 165, is mounted on a fixed part of the engine 200, receives the piston temperature signals from the telemetry unit 105. The wireless receiving interface 165 is preferably mounted on the oil pan 275 for ease of communication with the wireless transmitting interface 160 on the big end 225 of the connecting rod 220. Furthermore, the oil pan 275 is preferred because it has ample space for receiving the wireless receiving interface 165. The microprocessor 170, the RS232 module 175, and the data storage unit 180 can exist at any location outside of the engine 200.

While the invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for measuring temperature of a reciprocating piston inside an engine, comprising:
   one or more thermocouples,
      each of which passes through a piston pin,
      one end of each of which is inserted into a predetermined point of a piston,
      and each of which generates a potential difference according to temperature at the predetermined point; and
   a telemetry unit, which is mounted on a big end of a connecting rod, computing the piston temperature on a basis of the potential difference and wirelessly transmitting a signal of the piston temperature.

2. The apparatus of claim 1, wherein the telemetry unit is mounted on a connecting rod cap, which is attached to the big end of the connecting rod.

3. The apparatus of claim 1, wherein a bracket is mounted on an end of the piston pin, and an interior of the piston pin is filled with a buffer material so that the thermocouple passes through the bracket and the buffer material with protection.

4. The apparatus of claim 1, wherein a piston pin section of the thermocouple passing through the piston pin is formed with multi-wire.

5. The apparatus of claim 1, further comprising a cold junction temperature detector, wherein the telemetry unit can compute the piston temperature by adding a cold junction temperature and a relative temperature between a hot junction and a cold junction of the thermocouple.

6. The apparatus of claim 5, wherein the cold junction of the thermocouple is located inside of the telemetry unit and an isothermal block is provided with the telemetry unit so that the cold junction is located within the isothermal block of the telemetry unit.

7. The apparatus of claim 6, wherein the telemetry unit comprises:
   one or more multiplexers processing signals from the one or more thermocouples;
   an A/D converter converting analog signals from the multiplexer to digital signals;
   a cold junction temperature detector for measuring the cold junction temperature;
   a processor for computing the piston temperature on the basis of the digital signals from the A/D converter and signals from the cold junction temperature detector; and
   a wireless transmitting interface for transmitting the piston temperature signal from the processor in a wireless communication manner.

8. The apparatus of claim 7, further comprising a wireless receiving interface receiving the transmitted piston temperature signal from the wireless transmitting interface and being mounted on a fixed part of the engine.

9. The apparatus of claim 8, wherein the wireless receiving interface is mounted on an oil pan.

10. The apparatus of claim 1, wherein a frequency range used in the wireless communication between the wireless transmitting interface and the wireless receiving interface is set to minimize interference with a frequency range used in an ECU.

11. The apparatus of claim 10, wherein the frequency range used in the wireless communication is in the range between about 430 MHz–440 MHz.

12. An apparatus for measuring piston temperature, comprising:
   at least one thermocouple wherein one end portion of said thermocouple is housed within a piston pin and an operational end of said thermocouple is coupled to a piston near the piston pin such that the thermocouple generates a potential difference of piston temperature near the piston pin;
   a telemetry unit coupled to an end of a connecting rod wherein said telemetry unit computes a piston temperature based on the potential difference and transmits the piston temperature through a wireless communication; and
   a bracket configured and dimensioned to be coupled with an end of the piston pin and receive said thermocouple.

13. The apparatus of claim 12, wherein said piston pin is filled with a buffer material such that the thermocouple within said piston pin is protected.

14. The apparatus of claim 12, further comprising a cold junction temperature detector.

15. The apparatus of claim 12, further comprising an isothermal block housing said telemetry unit.

16. The apparatus of claim 12, further comprising a wireless receiver for receiving a transmitted signal from said telemetry unit.

17. The apparatus of claim 16, wherein said signal has a frequency range of between about 400 MHz–450 MHz.

18. A system of measuring piston temperature, comprising:
   a piston;
   a connecting rod having a first end and a second end;
   a piston pin configured and dimensioned to couple said piston near the first end of said connecting rod;
   a thermocouple having a portion received by said piston pin and an end portion of said thermocouple is coupled with said piston for measuring a piston temperature of said piston; and
   a telemetry unit coupled near the second end of said connecting rod wherein said telemetry unit is configured and dimensioned to receive the measured piston temperature from said thermocouple and transmit a signal of the measured piston temperature to a remote location.

* * * * *